(12) United States Patent
Liu et al.

(10) Patent No.: US 8,527,526 B1
(45) Date of Patent: Sep. 3, 2013

(54) SELECTING A LIST OF NETWORK USER IDENTIFIERS BASED ON LONG-TERM AND SHORT-TERM HISTORY DATA

(75) Inventors: Jia Liu, Sunnyvale, CA (US); Yijian Bai, San Ramon, CA (US); Manojav Patil, Sunnyvale, CA (US); Deepak Ravichandran, Mountain View, CA (US); Sittichai Jiampojamarn, Sunnyvale, CA (US); Shankar Ponnekanti, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/462,130

(22) Filed: May 2, 2012

(51) Int. Cl.
*G06F 7/00* (2006.01)

(52) U.S. Cl.
USPC ........................................................ 707/751

(58) Field of Classification Search
USPC ........................................................ 707/751
See application file for complete search history.

(56) References Cited

U.S. PATENT DOCUMENTS

| | | | |
|---|---|---|---|
| 5,974,398 A | 10/1999 | Hanson et al. | |
| 6,185,514 B1 | 2/2001 | Skinner et al. | |
| 6,269,351 B1 | 7/2001 | Black | |
| 6,487,538 B1 | 11/2002 | Gupta et al. | |
| 6,539,375 B2 | 3/2003 | Kawasaki | |
| 6,560,578 B2 | 5/2003 | Eldering | |
| 6,598,054 B2 | 7/2003 | Schuetze et al. | |
| 6,973,436 B1 | 12/2005 | Shkedi | |
| 7,103,584 B2 | 9/2006 | Lee | |
| 7,454,705 B2 | 11/2008 | Cadez et al. | |
| 7,685,278 B2 | 3/2010 | Cohen et al. | |
| 7,693,836 B2 | 4/2010 | Brave et al. | |
| 7,693,863 B2 | 4/2010 | Martin et al. | |
| 7,711,735 B2 | 5/2010 | Wu et al. | |
| 7,734,632 B2 | 6/2010 | Wang | |
| 7,739,314 B2 | 6/2010 | Datar et al. | |
| 7,769,786 B2 | 8/2010 | Patel | |
| 7,822,636 B1 | 10/2010 | Ferber et al. | |
| 7,882,175 B1 | 2/2011 | Nayfeh et al. | |
| 7,904,448 B2 | 3/2011 | Chung et al. | |
| 8,027,964 B2 | 9/2011 | Boulis | |
| 8,095,523 B2 | 1/2012 | Brave et al. | |
| 8,131,733 B2 | 3/2012 | Wang | |
| 8,321,934 B1 * | 11/2012 | Cooley et al. | ................... 726/22 |
| 2003/0033196 A1 | 2/2003 | Tomlin | |

(Continued)

OTHER PUBLICATIONS

U.S. Appl. No. 13/362,910, filed Jan. 31, 2012, Jia Liu et al.

(Continued)

*Primary Examiner* — Jensen Hu
(74) *Attorney, Agent, or Firm* — Foley and Lardner LLP; John D. Lanza (57) ABSTRACT

A computerized method, system for, and computer-readable medium operable to select a list of network user identifiers. A processing circuit receives a list of network user identifiers represented by long-term history data indicative of web pages visited prior to a first time and short-term history data indicative of web pages visited after the first time and prior to a second time. Long-term interest categories, corresponding weight values for each long-term interest category, short-term interest categories and corresponding weight values for each short-term interest category are identified. A model comprising the long-term and short-term interest categories is generated based on the weight values of the long-term and short-term interest categories using either arithmetic or harmonic progression. The processing circuit receives a list of candidate network user identifiers and generates a list of similar network user identifiers based on the model.

21 Claims, 5 Drawing Sheets

(56) References Cited

U.S. PATENT DOCUMENTS

| | | |
|---|---|---|
| 2004/0215509 A1 | 10/2004 | Perry |
| 2005/0049907 A1 | 3/2005 | Kumar et al. |
| 2006/0026062 A1 | 2/2006 | Collins |
| 2006/0069612 A1 | 3/2006 | Hurt et al. |
| 2006/0069616 A1 | 3/2006 | Bau |
| 2007/0061195 A1 | 3/2007 | Liu et al. |
| 2007/0067297 A1 | 3/2007 | Kublickis |
| 2007/0073579 A1 | 3/2007 | Immorlica et al. |
| 2007/0130005 A1 | 6/2007 | Jaschke |
| 2007/0156519 A1 | 7/2007 | Agassi et al. |
| 2007/0179846 A1 | 8/2007 | Jain et al. |
| 2007/0233556 A1 | 10/2007 | Koningstein |
| 2008/0071929 A1 | 3/2008 | Motte et al. |
| 2008/0126176 A1* | 5/2008 | Iguchi .................. 705/10 |
| 2008/0140524 A1 | 6/2008 | Anand et al. |
| 2008/0147659 A1 | 6/2008 | Chen et al. |
| 2008/0189174 A1 | 8/2008 | Moore |
| 2008/0201216 A1 | 8/2008 | Almeida |
| 2008/0215348 A1 | 9/2008 | Guldimann et al. |
| 2008/0300958 A1 | 12/2008 | Gluck |
| 2009/0006974 A1 | 1/2009 | Harinarayan et al. |
| 2009/0012852 A1 | 1/2009 | O'Kelley et al. |
| 2009/0048925 A1 | 2/2009 | Song et al. |
| 2009/0077495 A1 | 3/2009 | Bhat et al. |
| 2009/0164274 A1 | 6/2009 | Narayanaswamy et al. |
| 2009/0164395 A1 | 6/2009 | Heck |
| 2009/0248494 A1 | 10/2009 | Hueter et al. |
| 2009/0265243 A1 | 10/2009 | Karassner et al. |
| 2009/0327032 A1 | 12/2009 | Gunawardana et al. |
| 2010/0004975 A1 | 1/2010 | White et al. |
| 2010/0042500 A1 | 2/2010 | Pritchard et al. |
| 2010/0082421 A1 | 4/2010 | Tuladhar et al. |
| 2010/0121850 A1 | 5/2010 | Moitra et al. |
| 2010/0131835 A1 | 5/2010 | Kumar et al. |
| 2010/0217648 A1 | 8/2010 | Agarwal et al. |
| 2010/0228614 A1 | 9/2010 | Zhang et al. |
| 2010/0235241 A1 | 9/2010 | Wang et al. |
| 2010/0274753 A1 | 10/2010 | Liberty et al. |
| 2010/0318374 A1 | 12/2010 | Flake et al. |
| 2010/0325666 A1 | 12/2010 | Wiser et al. |
| 2011/0010324 A1 | 1/2011 | Bolivar et al. |
| 2011/0055008 A1 | 3/2011 | Feuerstein et al. |
| 2011/0071900 A1 | 3/2011 | Kamath et al. |
| 2011/0077998 A1 | 3/2011 | Yan et al. |
| 2011/0153423 A1 | 6/2011 | Elvekrog et al. |
| 2011/0191176 A1 | 8/2011 | Merriman et al. |
| 2011/0225608 A1 | 9/2011 | Lopatecki et al. |
| 2011/0231241 A1 | 9/2011 | Kesari et al. |
| 2011/0231257 A1 | 9/2011 | Winters |
| 2011/0231264 A1 | 9/2011 | Dilling et al. |
| 2011/0246267 A1 | 10/2011 | Williams et al. |
| 2011/0258039 A1 | 10/2011 | Patwa et al. |
| 2011/0264522 A1 | 10/2011 | Chan et al. |
| 2011/0288937 A1 | 11/2011 | Manoogian et al. |
| 2012/0010939 A1 | 1/2012 | Krishnamoorthy et al. |
| 2012/0047013 A1 | 2/2012 | Bigby et al. |

OTHER PUBLICATIONS

U.S. Appl. No. 13/462,425, filed May 2, 2012, Jia Liu et al.
U.S. Appl. No. 13/462,509, filed May 2, 2012, Jia Liu et al.
U.S. Appl. No. 13/462,630, filed May 2, 2012, Jia Liu et al.
U.S. Appl. No. 13/465,679, filed May 7, 2012, Alok Goel et al.
U.S. Appl. No. 13/465,730, filed May 7, 2012, Jia Liu et al.
U.S. Appl. No. 13/465,762, filed May 7, 2012, Jia Liu et al.
U.S. Appl. No. 13/476,532, filed May 21, 2012, Jia Liu et al.
U.S. Appl. No. 13/534,480, filed Jun. 27, 2012, Jia Liu et al.
U.S. Appl. No. 13/362,671, filed Jan. 31, 2012, Jia Liu et al.
U.S. Appl. No. 13/362,797, filed Jan. 31, 2012, Jia Liu et al.
U.S. Appl. No. 13/460,327, filed Apr. 30, 2012, Jia Liu et al.
U.S. Appl. No. 13/460,411, filed Apr. 30, 2012, Jia Liu et al.
U.S. Appl. No. 13/460,469, filed Apr. 30, 2012, Jia Liu et al.
"Clustering II" Powerpoint, EECS435, Spring 2008, 25 pages.
Bhat, Sudin, et al.; "Dynamic Real-Time Targeting Through Variable-Length Behavioral History", Apr. 18, 2009, © 2009 Microsoft, 4 pages.
http://en.wikipedia.org/wiki/Cluster_analysis; "Cluster Analysis", Wikipedia.org, retrieved Jan. 27, 2012, 15 pages.
http://en.wikipedia.org/wiki/Logistic_regression; "Logistic Regression", Wikipedia.org, retrieved Apr. 2, 2012, 14 pages.
Johnson, Mark; "Confidence Intervals on Likelihood Estimates for Estimating Association Strengths", Brown University, DRAFT of May 28, 1999, 7 pages.
Renals, Steve; "Classification and Nearest Neighbours"; Informatics 2B: Learning and Data Lecture 4, Jan. 28, 2011, 27 pages.
support.google.com/adwords/bin/answer.py?hl=en&answer=1209882; "Where Your Ad Can Appear on the Display Network Depending on Your Targeting Methods", support.google.com, retrieved Apr. 16, 2012, 4 pages.
support.google.com/adwords/bin/answer.py?hl=en&answer=171271; "How Do I Create a Custom Combination List?", support.google.com, retrieved Apr. 16, 2012, 3 pages.
www.techterms.com/definition/rpm; "RPM", © 2012 TechTerms.com, retrieved Apr. 9, 2012, 1 page.

* cited by examiner

SELECTING A LIST OF NETWORK USER IDENTIFIERS BASED ON LONG-TERM AND SHORT-TERM HISTORY DATA

BACKGROUND

The present disclosure relates generally to similar user identifiers.

From an advertiser's perspective, placing an advertisement on a web page may or may not be of interest or useful for the end users viewing the web page. In some systems, the content of a web page may be used to help select more relevant advertisements to be provided with the web page. For example, an advertiser selling golf clubs may advertise on a website devoted to golf, since visitors to the website may share a common interest in golf. Such systems may use keywords located in the text of the website to identify topics discussed on the website.

SUMMARY

A computerized method, system for, and computer-readable medium operable to select a list of network user identifiers. A processing circuit receives the list of network user identifiers, long-term history data indicative of web pages visited by one or more of network user identifiers prior to a first point in time, and short-term history data indicative of web pages visited by the one or more network user identifiers after the first point in time and prior to a second point in time. The processing circuit identifies one or more long-term interest categories, a corresponding weight value for each of the long-term interest categories based in part on the long-term history data, one or more short-term interest categories, and a corresponding weight value for each of the short-term interest categories based in part on the short-term history data. The processing circuit generates a model comprising the long-term and short-term interest categories. The model is generated based in part on the weight values of the long-term and short-term interest categories using either arithmetic or harmonic progression. The processing circuit receives a list of candidate network user identifiers, different from the list of network user identifiers, history data indicative of web pages visited by one or more of the candidate network user identifiers and corresponding weight data associated with the history data. The processing circuit generates a list of similar network user identifiers from the list of candidate network user identifiers, each similar network user identifier having a similarity to the model greater than a threshold value.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION OF ILLUSTRATIVE IMPLEMENTATIONS

According to some aspects of the present disclosure, the online behaviors of user identifiers may be used to provide audience-based advertising. As used herein, online behavior refers to how a user identifier interacts with web pages on the Internet (e.g., which web pages are visited, the order in which the web pages are visited, how long a particular web page is viewed, and similar information). In some implementations, a set of user identifiers associated with an online event (e.g., making an online purchase, being added to an advertiser's list of user identifiers, etc.) may be used as a basis to determine user identifiers having similar online behaviors.

A user may opt in or out of allowing an advertisement server to identify and store information about the user and/or about devices operated by the user. For example, the user may opt in to receiving advertisements from the advertisement server that may be more relevant to the user. In some implementations, the user may be represented as a randomized user identifier (e.g., a cookie, a device serial number, etc.) that contains no personally-identifiable information about the user. For example, information relating to the user's name, demographics, etc., may not be used by the advertisement server unless the user opts in to providing such information. Thus, the user may have control over how information is collected about him or her and used by an advertisement server.

In content-based advertising systems, advertisements are provided based on the content of a web page. For example, a web page devoted to golf may mention the terms "golf" and other golf-related terms. An advertising system that places advertisements on the web page may use the content of the web page itself and/or terms provided as part of a request for an advertisement (e.g., via an advertisement tag embedded into the code of the web page), to determine a theme for the web page. Based on the determined theme, a manufacturer of golf clubs may opt to place an advertisement on the web page.

Audience-based advertising, in contrast to content-based advertising, involves selecting advertisements based on the user identifier visiting a web page, instead of the content of the web page itself. For example, a user identifier may be associated with making an online reservation at a golf resort and navigating to a financial web page to check the stock market. Based on golf being a potential interest category associated with the user identifier, for example, an advertisement from a manufacturer of golf clubs may be provided with the financial web page, even though the financial web page is unrelated to golf.

One or more implementations described herein provides a method that allows a processing circuit to combine short-term and long-term history data into a single model using arithmetic or harmonic progression. Certain kinds of history data associated with a network user identifier are more short-term, while others are more long-term. For example, buying flowers may be a short-term, instinctive browsing activity, whereas purchasing a car may be rooted in more long-term browsing activities such as researching and comparing car models, safety reports, prices, etc. As a result, short-term history data may be more precise, fewer in quantity, and generally available and easily retrieved from a memory. In contrast, long-term history data may be more general, greater in quantity, and may be only available in disk format, making long term signals harder to retrieve. By generating a single model that combines short-term and long-term history data, an advertising system may decrease storage space and increase the relevance of content displayed to a network user identifier.

Figure 1:
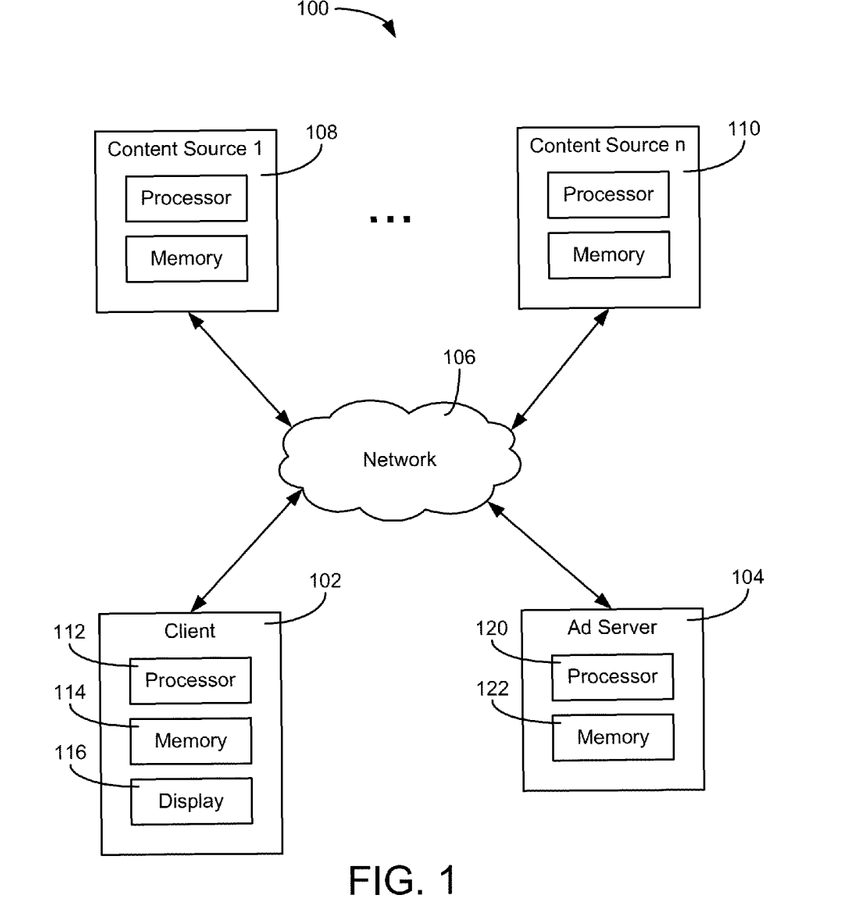
FIG. 1 is a block diagram of a computer system in accordance with an illustrative implementation.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide web pages and/or media content (e.g., audio, video, and other forms of digital content) to client 102. System 100 may also include an advertisement server 104, which provides advertisement data to other computing devices over network 106.

Network 106 may be any form of computer network that relays information between client 102, advertisement server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may further include a floppy disk, CD-ROM, DVD, magnetic disk, memory chip, application-specific integrated circuit (ASIC), field programmable gate array (FPGA), read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays web pages using web page data received from content sources 108, 110 and/or from advertisement server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, web page data, a movie, a sound file, pictures, and other forms of data. Similarly, advertisement server 104 may include a processing circuit including a processor 120 and a memory 122.

In some implementations, advertisement server 104 may include several computing devices (e.g., a data center, a network of servers, etc.). In such a case, the various devices of advertisement server 104 may be in electronic communication, thereby also forming a processing circuit (e.g., processor 120 includes the collective processors of the devices and memory 122 includes the collective memories of the devices).

Advertisement server 104 may provide digital advertisements to client 102 via network 106. For example, content source 108 may provide a web page to client 102, in response to receiving a request for a web page from client 102. In some implementations, an advertisement from advertisement server 104 may be provided to client 102 indirectly. For example, content source 108 may receive advertisement data from advertisement server 104 and use the advertisement as part of the web page data provided to client 102. In other implementations, an advertisement from advertisement server 104 may be provided to client 102 directly. For example, content source 108 may provide web page data to client 102 that includes a command to retrieve an advertisement from advertisement server 104. On receipt of the web page data, client 102 may retrieve an advertisement from advertisement server 104 based on the command and display the advertisement when the web page is rendered on display 116.

According to some implementations, advertisement server 104 may be configured to determine whether the online behavior of a user identifier from client 102 is similar to that of other user identifiers. In some cases, advertisement server 104 may determine the similarity between the online behavior associated with a user identifier and that of other user identifiers associated with a desired action, such as purchasing a certain good or navigating to a certain web page. For example, a number of user identifiers may be associated with visiting web pages from content sources 108, 110 devoted to tourist attractions in Seattle and going on to purchase airline tickets to Seattle. In such a case, advertisement server 104 may determine that a user identifier associated with client 102 is similar to those user identifiers associated with a purchase of airline tickets to Seattle based on client 102 navigating to web pages provided by content sources 108, 110.

In some implementations, advertisement server 104 may receive browsing history data to determine the online behaviors of user identifiers around a certain event. In one implementation, advertisement server 104 may use cookies and/or pixel tags to determine an online behavior of a user identifier. For example, a cookie associated with advertisement server 104 may be placed on client 102 and used as a user identifier. Whenever client 102 navigates to a web page that includes an advertisement from advertisement server 104, the cookie may be used to identify client 102 as having visited the web page. Other mechanisms to determine a user's browsing history may be used, in various implementations. For example, client 102 may have a unique device ID which may be used to identify client 102 as it navigates between different websites. In some cases, client 102 may navigate to websites that are outside of the advertising network of advertisement server 104 (e.g., the website does not include an advertisement from advertisement server 104). In some implementations, advertisement server 104 may receive publisher-provided data (e.g., user identifiers) from websites that are outside of the advertising network.

A user of client 102 may opt in or out of allowing advertisement server 104 to identify and store data relating to client 102. For example, the user may opt in to receiving advertisements from advertisement server 104 that may be more relevant to them. In one implementation, the client identifier used by advertisement server 104 may be randomized and contain no personally-identifiable information about the user. For example, information relating to the user's name, demographics, etc., may not be used by advertisement server 104 unless the user opts in to providing such information. Thus, the user of client 102 may have control over how information is collected about them and used by advertisement server 104, in various implementations.

According to various implementations, advertising server 104 may generate a behavioral model based on the online behaviors of user identifiers associated with an online event, such as visiting a certain web page, purchasing a particular good or service, being added to a list of users by an advertiser, or the like. In some implementations, advertisement server 104 may receive a list of user identifiers from an advertiser (e.g., a set of cookies or other device identifiers). For example, an online retailer may provide a list of user identifiers associated with purchases of a certain good or service to advertisement server 104. Advertisement server 104 may use the provided list to determine a set of similar user identifiers by comparing the online behaviors of the user identifiers on the list to that of other user identifiers. In some cases, advertisement server 104 may provide an indication of the set of identified user identifiers back to the advertiser.

Figure 2:
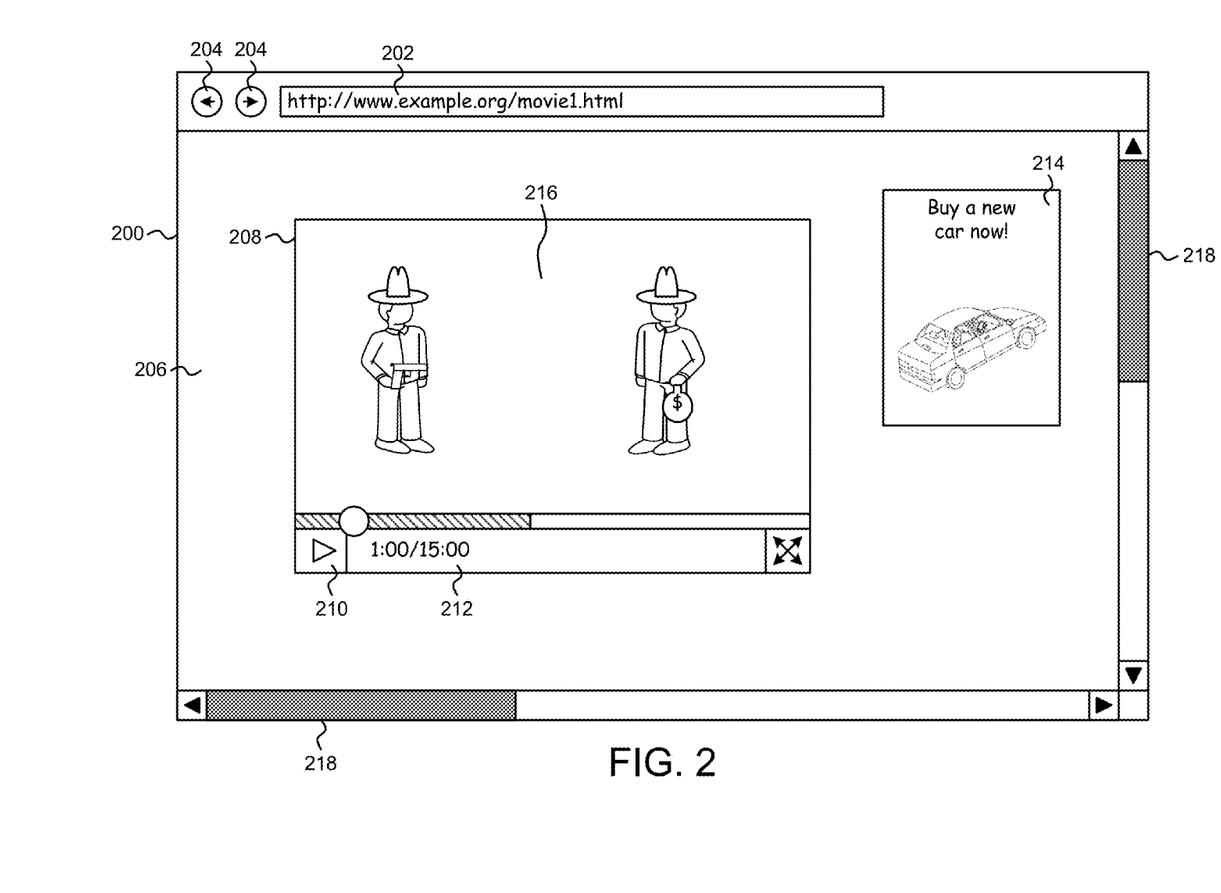
FIG. 2 is an illustration of an example web page having an advertisement.

Referring now to FIG. 2, an example display 200 is shown. Display 200 is in electronic communication with one or more processors that cause visual indicia to be provided on display 200. Display 200 may be located inside or outside of the housing of the one or more processors. For example, display 200 may be external to a desktop computer (e.g., display 200 may be a monitor), may be a television set, or any other stand-alone form of electronic display. In another example, display 200 may be internal to a laptop computer, mobile device, or other computing device with an integrated display.

As shown in FIG. 2, the one or more processors in communication with display 200 may execute a web browser application (e.g., display 200 is part of a client device). The web browser application operates by receiving input of a uniform resource locator (URL) into a field 202, such as a web address, from an input device (e.g., a pointing device, a keyboard, a touchscreen, or another form of input device). In response, one or more processors executing the web browser may request data from a content source corresponding to the URL via a network (e.g., the Internet, an intranet, or the like). The content source may then provide web page data and/or other data to the client device, which causes visual indicia to be displayed by display 200.

The web browser providing data to display 200 may include a number of navigational controls associated with web page 206. For example, the web browser may include the ability to go back or forward to other web pages using inputs 204 (e.g., a back button, a forward button, etc.). The web browser may also include one or more scroll bars 218, which can be used to display parts of web page 206 that are currently off-screen. For example, web page 206 may be formatted to be larger than the screen of display 200. In such a case, one or more scroll bars 218 may be used to change the vertical and/or horizontal position of web page 206 on display 200.

In one example, additional data associated with web page 206 may be configured to perform any number of functions associated with movie 216. For example, the additional data may include a media player 208, which is used to play movie 216. Media player 208 may be called in any number of different ways. In one implementation, media player 208 may be an application installed on the client device and launched when web page 206 is rendered on display 200. In another implementation, media player 208 may be part of a plug-in for the web browser. In another implementation, media player 208 may be part of the web page data downloaded by the client device. For example, media player 208 may be a script or other form of instruction that causes movie 216 to play on display 200. Media player 208 may also include a number of controls, such as a button 210 that allows movie 216 to be played or paused. Media player 208 may include a timer 212 that provides an indication of the current time and total running time of movie 216.

The various functions associated with advertisement 214 may be implemented by including one or more advertisement tags within the web page code located in "moviel.html" and/or other files. For example, "moviel.html" may include an advertisement tag that specifies that an advertisement slot is to be located at the position of advertisement 214. Another advertisement tag may request an advertisement from a remote location, for example, from an advertisement server, as web page 206 is loaded. Such a request may include client identification data (e.g., a cookie, device ID, etc.) used by the advertisement server as a user identifier. In this way, the advertisement server is able to determine browsing history associated with a user identifier as it is used to navigate between various web pages that participate in the advertising network (e.g., web pages that include advertisements from the advertisement server).

Figure 3:
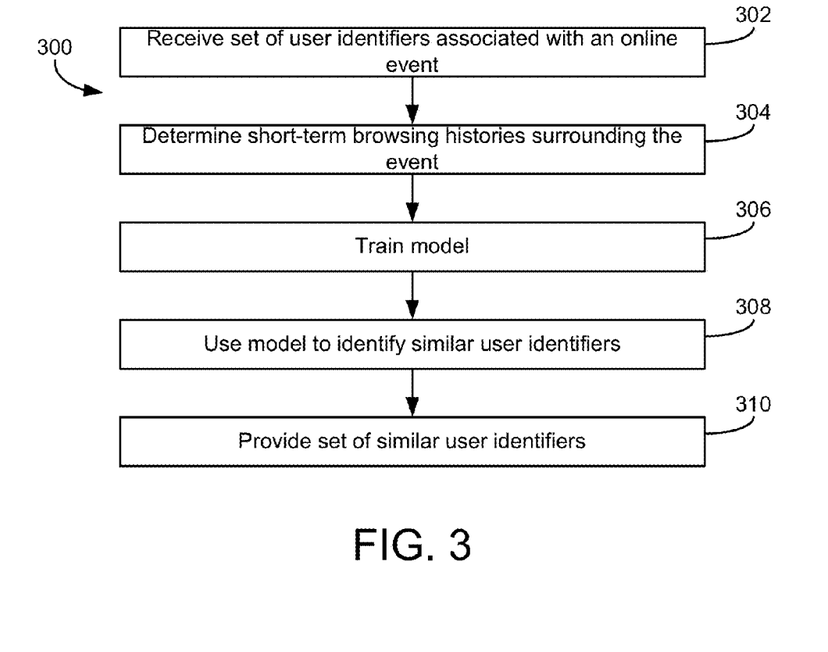
FIG. 3 is an example process for identifying similar online user identifiers.

Referring now to FIG. 3, an example process 300 for determining similar online user identifiers. In some implementations, advertisers may compete in an advertising auction for the ability to place an advertisement on a given web page. An advertiser having access to a set of user identifiers that are similar to other user identifiers associated with making a purchase, for example, may adjust their bid accordingly if one of the similar user identifiers requests a web page having an embedded advertisement.

Process 300 includes receiving data indicative of a set of user identifiers associated with an online event (block 302). In general, an online event may correspond to any action performed by an online user. For example, an online event may correspond to visiting a web page, clicking on a particular link (e.g., a hyperlink, an advertisement link, etc.), navigating between a set of web pages, ending their browsing session, spending a certain amount of time on a given web page, purchasing a good or service, or any other action that may be performed by an online user. In some implementations, the set of users may be represented using device identifiers (e.g., cookies, device IDs, etc.) for the electronic devices operated by the users. In some implementations, the set of user identifiers may also include information about when the event occurred with respect to a user in the set. For example, the received set may include information about when a particular user visited a web page, made a purchase, or performed any other online action.

In one example, an online retailer may wish to place advertisements via an advertising network. To provide relevant advertisements, the retailer may generate a list of user identifiers associated with visits to the retailer's website and/or purchases made via the website. The list of user identifiers may be a list of cookies, device IDs, or other information that can be used by the advertising network to determine online behaviors associated with the user identifiers on the list. For example, a mobile telephone having a unique device ID may be used to access the retailer's website. If the user has opted in to allowing information about the user to be collected, the retailer may record the device ID as a user identifier and provide it to the advertising network. The advertising network may then use the user identifier to identify similar user identifiers.

Process 300 includes determining short-term browsing histories surrounding the event (block 304). In some implementations, the system that receives the set of user identifiers may retrieve information regarding the browsing histories associated with the user identifiers in the set. For example, a server of an advertising network may store browsing history information for user identifiers that visited websites participating in the advertising network (e.g., websites that display advertisements provided by the advertising network). Such information may be collected, for example, by receiving identification information (e.g., a cookie, device ID, etc.) each time a user identifier is used to access a web page displaying an advertisement from the advertising network. Such information may be used to reconstruct, or partially reconstruct, a user's browsing history, provided that the user has opted in to allowing such information to be used. In other implementations, the browsing history may be predetermined by another device outside of the advertising network (e.g., the browsing history data may be publisher-provided).

The short-term browsing history for a user identifier refers to data about which web pages were visited within a particular period of the online event. In various implementations, the short-term browsing history for a user identifier surrounding an event may include data about the web pages visited by the user identifier less than one, two, five, twelve, or twenty four hours prior to the event. In some implementations, the short-term browsing history for a user identifier may include data about the web pages visited by the user identifier less than one, two, five, twelve, or twenty four hours after the occurrence of the event. In some implementations, long-term browsing histories may be used (e.g., browsing history data from a period longer than the particular period associated with the short-term browsing history). However, in contrast to long-term browsing history, short-term browsing history may provide more insight into a user identifier's interests surrounding the event. For example, a user may have a long-term interest in professional football. However, the user may have a short-term interest in purchasing flowers for his wife's birthday. Analyzing the user's short-term browsing history surrounding his online purchase of flowers may exclude the topic of football from being associated with the purchase of flowers. According to various implementations, the short-term browsing histories may be determined for the entire set of user identifiers or for a subset of the user identifiers (e.g., a random sampling of the user identifiers, a subset selected up to a predetermined amount of user identifiers, etc.).

Process 300 includes training a behavioral model (block 306). In some implementations, the browsing history data associated with the user identifiers in the received set may be used to train a behavioral model. In general, the behavioral model may determine commonalities among the online behaviors associated with the user identifiers. For example, a large number of user identifiers that purchase organic peanut butter from a retailer may have recently visited a web page devoted to a recipe for an all-organic peanut butter and banana sandwich. Such a characteristic may be used to identify other user identifiers that are also likely to become associated with purchasing organic peanut butter from the retailer.

Process 300 includes using the model to identify similar user identifiers to those in the received set (block 308). In general, the set of similar user identifiers may include device identifiers (e.g., cookies, unique device IDs, etc.) or other information that may be used to determine that a user identifier in the set of similar user identifiers is being used to request a web page. For example, the set of similar user identifiers may be provided to an advertiser and used by the advertiser to select relevant advertisements. In some implementations, the set of similar user identifiers may be provided to an advertising server that conducts an advertising auction (block 310). An advertiser may utilize the set of similar user identifiers to adjust auction bids to provide an advertisement to those user identifiers. For example, a user identifier that visits a web page devoted to plumbing repairs may have a browsing history similar to that of user identifiers associated with purchasing copper tubing. When the user identifier visits a web page, even a web page unrelated to plumbing, advertisers may participate in an auction to place an advertisement on the web page. In such a case, an advertiser may place a higher bid in the auction to provide an advertisement for copper tubing to the user identifier.

Figure 4:
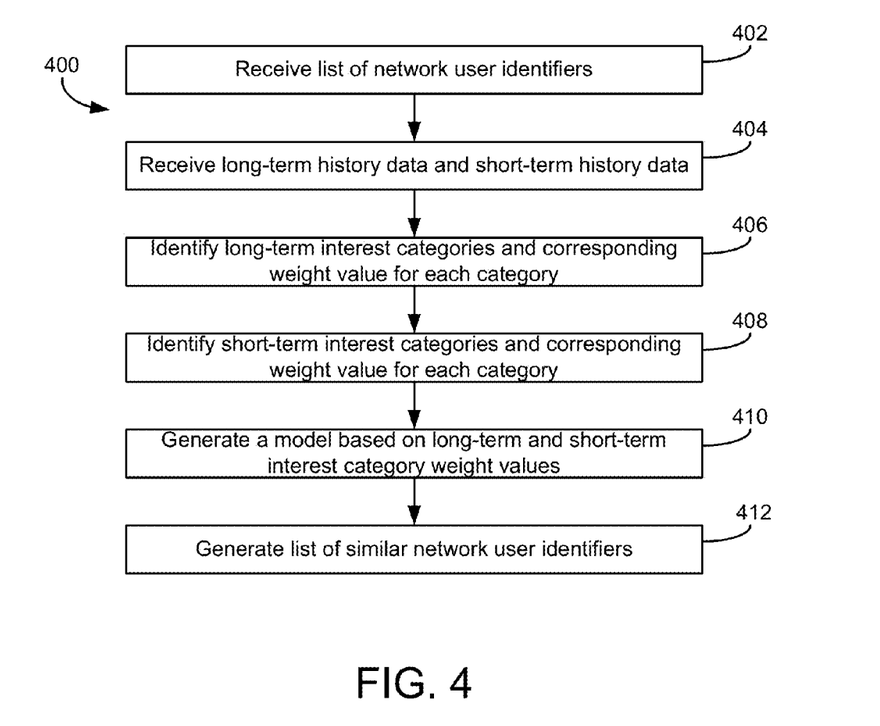
FIG. 4 is an example process for selecting a list of network user identifiers using long-term and short-term browsing history data.

In some implementations, as illustrated in FIG. 4, the processing circuit performs process 400 for selecting a list of network users. Process 400 may be implemented by an advertisement server or other computing device having access to some or all of a network user identifier's history data. Process 400 includes receiving a list of network user identifiers (block 402).

The processing circuit also receives long-term history data indicative of web pages visited by one or more of the network user identifiers prior to a first point in time and short-term history data indicative of web pages visited by the one or more network user identifiers after the first point in time and prior to a second point in time (block 404). The first point in time may correspond, for example, to a time that is at most twenty-four hours prior to a current time. The second point in time may correspond, for example, to the current time. Alternatively, the second point in time may correspond to the time at which the network user identifier was added to the list of network user identifiers.

In general, history data refers to information about web pages visited by a user identifier, as authorized by the user, such as the network address of the web page and a time when the web page was accessed. In some cases, history data may be determined using a client identifier for a client device operated by the user. In some implementations, a set of client identifiers may be associated with a particular user. For example, a user may log in to their user profile on a social networking site using any number of different devices (e.g., a home computer, a smart phone, etc.), each having a different client identifier. By associating the different client identifiers with the same user, the history data for the user may include websites visited using any of the user's devices.

In some implementations, the history data may be received as part of a request for an advertisement or other content. For example, a client identifier may be provided to an advertisement server as part of an advertisement request. Such a request may also include the URL or other network address of the web page on which the requested advertisement is to be placed. In some cases, the history data may include a timestamp indicative of when the web page was requested by a client device. If no timestamp is included in the history data, a timestamp corresponding to when the advertisement request is received may be associated with it. In one example, the history data may indicate that a user's mobile phone requested the web page http://www.example.org/weather.html on Aug. 11, 2014 at 3:35 PM EST.

In further implementations, some or all of the history data may be provided by a third-party entity. For example, some of the history data may be received by an advertisement server from a website that does not use advertisements from the advertisement server. In another example, some or all of the history data may be received from an entity that analyzes Internet traffic. In some implementations, some or all of the online history may be provided by users themselves. For example, a user may opt in to periodically sending his or her history data to an advertisement server, so that the advertisement server can select advertisements in which he or she may be interested.

The processing circuit identifies one or more long-term interest categories and a corresponding weight value for each of the long-term interest categories based in part on the long-term history data (block 406). In addition, the processing circuit identifies one or more short-term interest categories and a corresponding weight value for each of the short-term interest categories based in part on the short-term history data (block 408). In some implementations, web page themes may be self-identified (i.e., within the web page code and transparent to a user). For example, an advertisement tag on a web page may include self-identified themes for the web page. In some implementations, web page themes may be identified based on the content of a web page identified in the history data. For example, a web page devoted to golf may include text and/or images that may be used to identify the theme of the web page as being golf. In some cases, both self-identified and content-based themes may be used to categorize a web page. Identified web page themes may then be matched to predefined interest categories, allowing interest categories to be associated with the user. In some cases, interest categories may be broken down into subcategories. For example, a first interest category may be /Sports and a subcategory may be /Sports/Bowling. In this way, different levels of granularity may be specified by an advertiser or other content provider to provide relevant content to users.

In some implementations, long-term interests may be determined using the entirety of the received history data for the network user identifier. In other implementations, upper and/or lower time thresholds may be used to define which web page visits in the history data are used to determine the long-term interests of a network user identifier. In some implementations, an upper time threshold may be less than approximately three months prior to the current date, less than approximately two months prior to the current date, less than approximately one month prior to the current date, or less than approximately two weeks prior to the current date. In some implementations, a lower time threshold may be greater than or equal to approximately one day prior to the current date. For example, the long-term interests of a user may be determined based on web pages visited by the user in the past thirty days through the previous day.

In some implementations, long-term interests may be computed periodically as a batch job. Offloading the long-term interest determinations to a batch job may allow computing resources to be conserved. In some implementations, a daily batch job may be run to determine a network user identifier's interests in the previous day. For example, a network user identifier may have the following online activity in the previous thirty days (i.e., approximately a month):

TABLE 1

| Date | Number of Page Views | Website | Theme |
|---|---|---|---|
| 28 days ago | 15 | www.airfare.test | airline tickets |
| 5 days ago | 10 | www.researchcars.test | cars |
| 1 day ago | 20 | www.tubes.test | movies |
| Today | 5 | www.researchcars.test | cars |

Such online activity may indicate, for example, that a network user identifier visited fifteen web pages on the website www.airfare.test to search for airline tickets twenty-eight days ago.

Short-term interests refer to those that are based on the history data of a network user identifier within the previous day or thereabouts. Upper and/or lower time threshold may also be used to define the time period from which the short-term interests are determined. For example, the upper time threshold may be less than approximately twenty four hours prior to the current time, less than approximately four hours prior to the current time, or less than approximately two hours prior to the current time. Similarly, the lower time threshold may be the current time, greater than approximately fifteen minutes prior to the current time, or greater than approximately one hour prior to approximately one hour prior to the current time. In various implementations, short-term interest categories may be determined using online data indicative of web page visits within less than approximately twenty four hours, less than approximately twelve hours, less than approximately four hours, or less than approximately one hour prior to the current time. For example, a network user identifier may have visited three web pages in the last fifteen minutes devoted to airfares. In such a case, the user's short-term interests may include the interest category of airline tickets (e.g., /travel/airline tickets).

Short-term interest categories may be determined in a manner similar to that of long-term interests. In some implementations, a weighting may be applied to short-term interest categories based on the number of page views, the commerciality of the web pages, a time decay function, or other factors that take into account the strength of the user's interest and/or the value of the interest category to potential advertisers. In some cases, the weightings may be used to select the top short-term interests of a network user identifier. For example, the top three short-term interests of a user may be selected.

In some implementations, short-term interests may be calculated on the fly, i.e., whenever a network user identifier visits a new web page. While the long-term history data for a network user identifier may be too large to compute the network user identifier's long-term interests on the fly, the reduced size of the online history used for short-term interests may be such that a network user identifier's short-term interest categories may be continually updated. For example, a network user identifier's short-term interests may include the interest category of /shopping/flowers, if the network user identifier visited three web pages devoted to florists in the past hour. In this way, an online florist may provide an advertisement to the network user identifier, since the network user identifier is likely in the market to order flowers.

Process 400 further includes generating a model from the long-term and short-term interest categories based, in part, on the weight values of the long-term and short-term interest categories (block 410). In general, a model is a description of observed or predicted behavior of some system, simplified by ignoring certain details. Models allow complex systems, both existent and merely specified, to be understood and their behavior predicted. A model may be used as the basis for simulation.

Figure 5:
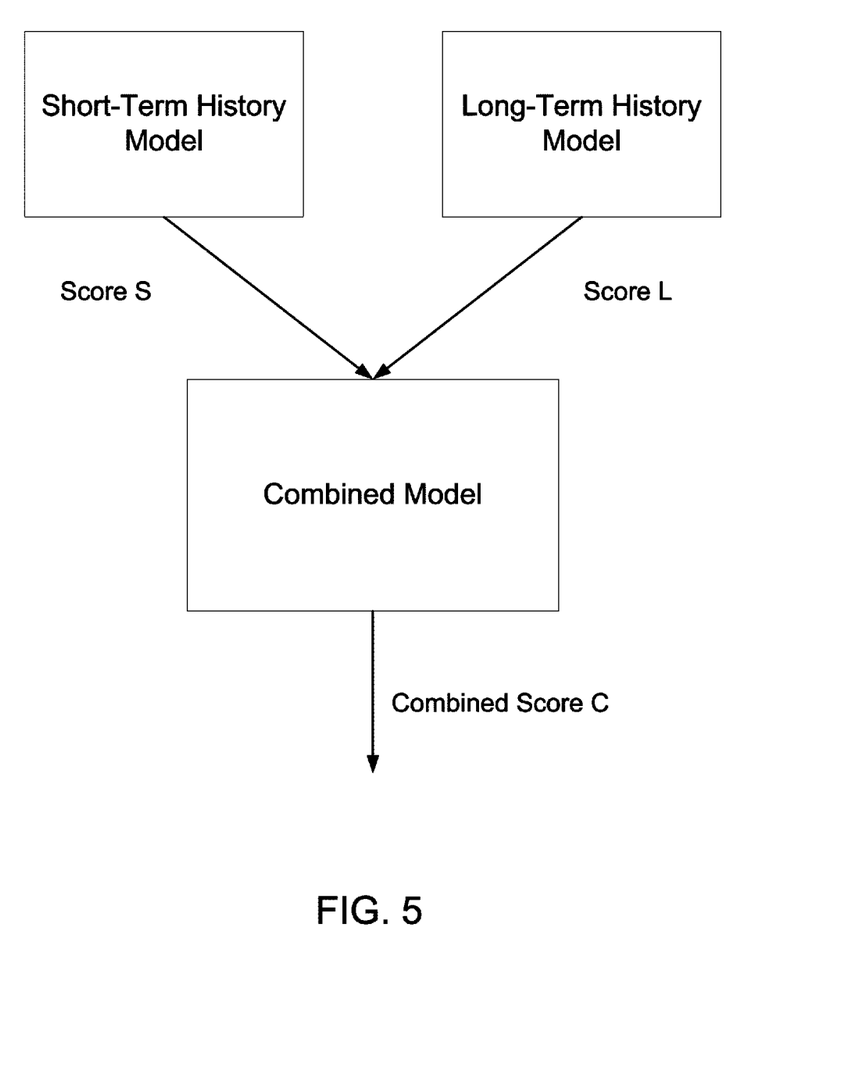
FIG. 5 is an example process for generating a model based on long-term and short-term history data.

Referring now to FIG. 5, an example process for generating a model based on long-term and short-term history data is illustrated. A short-term history model and a long-term history model can be combined into one model by techniques such as arithmetic progression or harmonic progression. The short-term history model comprises the short-term history data, specifically, the short-term interest categories and weight values. The long-term model comprises the long-term history data, specifically, the long-term interest categories and weight values. For purposes of combining the short-term and long-term history models, the short-term model assigns a score of S and the long-term model assigns a score of L. In some implementations, the value of S and L may be a value chosen by the advertising system for every advertiser in a particular advertising category. The combined model has a score of C with combination weight of Ws (e.g. the corresponding weight values of the short-term interest categories) & Wl (e.g. the corresponding weight values of the long-term interest categories). In one implementation, the values of S, L, Ws, and Wl may be any value from zero to one. The combined model can be manually compiled and loaded into the system memory.

In one implementation, the combined model can be generated by arithmetic progression according to the equation:

$$C=(Ws*S+Wl*L)/(Ws+Wl) \quad (\text{Eq. 1})$$

where the score C is a combination of short-term weight Ws and long-term weight Wl, S is a score of the short-term history data, and L is a score of the long-term history data.

In another implementation, the combined model can be generated by harmonic progression according to the formula:

$$C=(Ws+Wl)/(Ws/S+Wl/L) \quad (\text{Eq. 2})$$

where the score C is a combination of short-term weight Ws and long-term weight Wl, S is a score of the short-term history data, and L is a score of the long-term history data.

Referring now to FIG. 4, the combined model can be used to generate a list of similar network user identifiers in a way similar to step 308 described in process 300 (block 412). In order to generate the list of similar network users, the processing circuit receives a list of candidate network user identifiers that do not appear in the list of network user identifiers (e.g., a pool of network user identifiers, existing in the advertising network, that may or may not be similar user identifiers). Each candidate network user identifier is represented by history data indicative of web pages visited by the candidate network user identifier and corresponding weight data associated with the history data. Several types of algorithms are known and can be utilized by the processing circuit to generate the list of similar network user identifiers, for example, clustering. The list of similar network users identifiers are generated based in part on a comparison between the weight values for each of the one or more long-term and short-term interest categories associated with the generated model and the history data and corresponding weight data associated with the candidate network user identifiers. Using the combined model to generate the list of similar network user identifiers, an advertising system may decrease storage space and increase the relevance of content displayed to a network user identifier. The processing circuit may generate display data configured to display the list of similar network user identifiers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus or processing circuit on data stored on one or more computer-readable storage devices or received from other sources.

The term "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface (GUI) or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A computerized method of selecting a list of network user identifiers, the method comprising:
   receiving, at a processing circuit, the list of network user identifiers;
   receiving, at the processing circuit, long-term history data indicative of web pages visited by one or more of the network user identifiers from the received list of network user identifiers prior to a first point in time and short-term history data indicative of web pages visited by the one or more network user identifiers after the first point in time and prior to a second point in time;
   identifying, by the processing circuit:
      one or more long-term interest categories associated with the long-term history data,
      a weight value for each of the one or more long-term interest categories based at least in part on the long-term history data,
      one or more short-term interest categories associated with the short-term history data, and
      a weight value for each of the one or more short-term interest categories based at least in part on the short-term history data;

generating, by the processing circuit, a model comprising the one or more long-term and short-term interest categories, wherein the model is generated based in part on the weight values for each of the one or more long-term and short-term interest categories;

receiving, at the processing circuit, a list of candidate network user identifiers different from the list of network user identifiers, history data indicative of web pages visited by one or more of the candidate network user identifiers, and corresponding weight data associated with the history data; and applying, by the processing circuit, the generated model to the list of candidate network user identifiers to generate a list of similar network user identifiers.

2. The method of claim 1, wherein the first point in time corresponds to a time that is at most twenty-four hours prior to a current time.

3. The method of claim 1, wherein the short-term history data is indicative of web pages visited by the network user identifiers within at most four hours prior to a current time.

4. The method of claim 1, wherein the model is generated by arithmetic progression according to an equation having the form:

$$C=(Ws*S+Wl*L)/(Ws+Wl),$$

where a score C is a combination of short-term weight Ws and long-term weight Wl, S is a score of the short-term network activity, and L is a score of the long-term network activity.

5. The method of claim 1, wherein the model is generated by harmonic progression according to an equation having the form:

$$C=(Ws+Wl)/(Ws/S+Wl/L),$$

where a score C is a combination of short-term weight Ws and long-term weight Wl, S is a score of the short-term network activity, and L is a score of the long-term network activity.

6. The method of claim 1 further comprising generating display data configured to display the list of similar network user identifiers on a user interface.

7. The method of claim 1, wherein the list of similar network users identifiers are generated based in part on a comparison between the weight values for each of the one or more long-term and short-term interest categories associated with the generated model and the history data and corresponding weight data associated with the candidate network user identifiers.

8. A system for selecting a list of network user identifiers comprising a processing circuit operable to:
receive the list of network user identifiers;
receive long-term history data indicative of web pages visited by one or more of the network user identifiers from the received list of network user identifiers prior to a first point in time and short-term history data indicative of web pages visited by the one or more network user identifiers after the first point in time and prior to a second point in time;
identify:
one or more long-term interest categories associated with the long-term history data,
a weight value for each of the one or more long-term interest categories based at least in part on the long-term history data,
one or more short-term interest categories associated with the short-term history data, and
a weight value for each of the one or more short-term interest categories based at least in part on the short-term history data;
generate a model comprising the one or more long-term and short-term interest categories, wherein the model is generated based in part on the weight values for each of the one or more long-term and short-term interest categories;
receive a list of candidate network user identifiers different from the list of network user identifiers, history data indicative of web pages visited by one or more of the candidate network user identifiers and corresponding weight data associated with the history data; and
apply the generated model to the list of candidate network user identifiers to generate a list of similar network user identifiers.

9. The system of claim 8, wherein the first point in time corresponds to a time that is at most twenty-four hours prior to a current time.

10. The system of claim 8, wherein the short-term history data is indicative of web pages visited by the network user identifiers within at most four hours prior to a current time.

11. The system of claim 8, wherein the model is generated by arithmetic progression according to an equation having the form:

$$C=(Ws*S+Wl*L)/(Ws+Wl),$$

where a score C is a combination of short-term weight Ws and long-term weight Wl, S is a score of the short-term network activity, and L is a score of the long-term network activity.

12. The system of claim 8, wherein the model is generated by harmonic progression according to an equation having the form:

$$C=(Ws+Wl)/(Ws/S+Wl/L),$$

where a score C is a combination of short-term weight Ws and long-term weight Wl, S is a score of the short-term network activity, and L is a score of the long-term network activity.

13. The system of claim 8, wherein the processing circuit is further operable to generate display data configured to display the list of similar network user identifiers on a user interface.

14. The system of claim 8, wherein the list of similar network users identifiers are generated based in part on a comparison between the weight values for each of the one or more long-term and short-term interest categories associated with the generated model and the history data and corresponding weight data associated with the candidate network user identifiers.

15. A computer-readable storage medium having instructions thereon that cause one or more processors to perform operations, the operations comprising:
receiving the list of network user identifiers;
receiving long-term history data indicative of web pages visited by one or more of the network user identifiers from the received list of network user identifiers prior to a first point in time and short-term history data indicative of web pages visited by the one or more network user identifiers after the first point in time and prior to a second point in time;
identifying:
one or more long-term interest categories associated with the long-term history data, a weight value for each of the one or more long-term interest categories based at least in part on the long-term history data,
one or more short-term interest categories associated with the short-term history data, and
a weight value for each of the one or more short-term interest categories based at least in part on the short-term history data;
generating a model comprising the one or more long-term and short-term interest categories, wherein the model is generated based in part on the weight values for each of the one or more long-term and short-term interest categories;
receiving a list of candidate network user identifiers different from the list of network user identifiers, history data indicative of web pages visited by one or more of the candidate network user identifiers and corresponding weight data associated with the history data; and
applying the generated model to the list of candidate network user identifiers to generate a list of similar network user identifiers.

16. The computer-readable storage medium of claim 15, wherein the first point in time corresponds to a time that is at most twenty-four hours prior to a current time.

17. The computer-readable storage medium of claim 15, wherein the short-term history data is indicative of web pages visited by the network user identifiers within at most four hours prior to a current time.

18. The computer-readable storage medium of claim 15, wherein the model is generated by arithmetic progression according to an equation having the form:

$$C=(Ws*S+Wl*L)/(Ws+Wl),$$

where a score C is a combination of short-term weight Ws and long-term weight Wl, S is a score of the short-term network activity, and L is a score of the long-term network activity.

19. The computer-readable storage medium of claim 15, wherein the model is generated by harmonic progression according to an equation having the form:

$$C=(Ws+Wl)/(Ws/S+Wl/L),$$

where a score C is a combination of short-term weight Ws and long-term weight Wl, S is a score of the short-term network activity, and L is a score of the long-term network activity.

20. The computer-readable storage medium of claim 15, wherein the operations further comprise generating display data configured to display the list of similar network user identifiers on a user interface.

21. The computer-readable storage medium of claim 15, wherein the list of similar network users identifiers are generated based in part on a comparison between the weight values for each of the one or more long-term and short-term interest categories associated with the generated model and the history data and corresponding weight data associated with the candidate network user identifiers.

* * * * *